United States Patent [19]

Haslim et al.

[11] Patent Number: 4,690,353

[45] Date of Patent: Sep. 1, 1987

[54] ELECTRO-EXPULSIVE SEPARATION SYSTEM

[75] Inventors: Leonard A. Haslim, Hayward; Robert D. Lee, San Mateo, both of Calif.

[73] Assignee: The United States of America as represented by the Administrator of the National Aeronautics and Space Administration, Washington, D.C.

[21] Appl. No.: 739,792

[22] Filed: May 31, 1985

[51] Int. Cl.⁴ .............................................. B64D 15/00
[52] U.S. Cl. .................................. 244/134 D; 318/116
[58] Field of Search .......................... 310/15, 308–310; 318/114, 119, 116; 244/134 R–134 D

[56] References Cited

U.S. PATENT DOCUMENTS

| 3,672,610 | 6/1972 | Levin | 244/134 R |
| 3,809,341 | 5/1974 | Levin | 244/134 R |
| 4,494,715 | 1/1985 | Weisend, Jr. | 244/134 A |
| 4,545,553 | 10/1985 | Finke | 244/134 D |

FOREIGN PATENT DOCUMENTS

| 595241 | 3/1960 | Canada. |  |
| 505433 | 5/1939 | United Kingdom | 244/134 |

Primary Examiner—Donovan F. Duggan
Attorney, Agent, or Firm—Darrell G. Brekke; John R. Manning; Robert D. Marchant

[57] ABSTRACT

An electro-expulsive system 20 has one or more overlapped conductors OC1-OCN each comprising a flexible ribbon conductor 32 which is folded back on itself. The conductors are embedded in an elastomeric material 33. Large current pulses are fed to the conductors OC1-OCN from power storage units 1-N. As a result of the antiparallel currents I and I', the opposed segments of a conductor 32 are forcefully separated and the elastomeric material is distended. Void 34 in the elastomer aids the separation of the conductor segments. The distention is almost instantaneous when a current pulse reaches the conductor and the distention tends to remove any solid body on the surface of the elastomeric material.

27 Claims, 15 Drawing Figures

ELECTRO-EXPULSIVE SEPARATION SYSTEM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to a novel system for separating a solid body from the surface of a resilient member. It utilizes very high repulsive forces to impart rapid expulsive movements to a flexible elastomeric member. The forces are generated by overlapping conductive members that receive a very high instantaneous current pulse from a power storage unit. The forces distend the elastomeric member and separate the elastomeric member from a solid body thereon. The invention is useful for separating ice gathered on a substrate, and it is particularly useful for aircraft deicing applications. It relates to an aircraft deicing system which does not require stretching of the aircraft structural members themselves in order to dislodge the accreted ice. Most especially, it relates to such a system that can be provided as a retrofit on existing aircraft.

2. Description of the Prior Art

Low-altitude, slow flying aircraft such as the helicopter are especially vulnerable to the effects of an icing environment. United States military and civilian helicopters are not currently certified to operate in weather where even light icing conditions might occur. Having all-weather flying capability could greatly expand the utility of the helicopter. A major technological impediment to extending helicopter operations into the all-weather flight regime is that of rotor blade ice accumulation. The sensitivity of the blades to ice accretion is well recognized; however, a satisfactory rotor blade deicing system has heretofor been unavailable.

A wide variety of systems are known in the art for removing ice from aircraft during flight. Examples of such techniques include electrothermal systems, which have a high power demand and are therefore relatively heavy; heated fluids or chemical sprays, which have performance and duration limitations; pneumatic boot systems, which have slow response times and adverse aerodynamic effects; and electromagnetic coils for inducing moving of the structural members themselves, which are of limited practical application, due to material fatigue considerations, size and location restrictions, rigidity of structure, and high power demand. Also, such movement of aircraft structural members often imposes large loads in directions which the structural members are least suited to resist them.

The typical cycle time for a pneumatic deicing system to go from one relaxed state to the next (with an expansion state in between) is close to two minutes. The long expansion period results in aerodynamic degradation. The typical pneumatic deicer is inoperative if the accreted ice layer is thinner than one-quarter inch. When the ice layer is thinner than one-quarter inch, the layer flexes, but does not crack, when the boot is expanded. Aerodynamic performance is obviously impaired when the ice buildup is that great.

The thermal approach to ice removal from airfoils is exemplified by U.S. Pat. No. 1,819,497 to Chrisholm which discloses the use of electrical energy to generate heat in the airfoil surface to melt the ice and to loosen it sufficiently so that it may be blown away. This process requires that a large amount of electric power be dissipated in order to achieve a practical melt period. The electrothermal deicers used on present day aircraft require approximately 12-27 watts/in.$^2$. One military helicopter with a two-blade rotor requires a dedicated 2 kva power supply to operate its electrothermal deicer.

There are numerous references which disclose devices within a airfoil which attempt to break loose ice on the airfoil by deforming the skin of the airfoil. British Patent Specification No. 505,433, Goldschmidt, May 5, 1939, discloses various wing deicers that use internal "hammers" to distort the leading edge of the wing. The wings have either a single or a double-wall leading edge and the "hammers" may be electric, hydraulic or pneumatic. In still another embodiment, electric currents are passed through the inner and outer walls of the wing in order to force apart the walls and deform the wall on which the ice has collected. U.S. Pat. No. 3,549,964 to Levin reveals an aircraft deicer wherein pulses from a pulse generator are routed to a coil (or a spark-gap pressure transducer) adjacent the inner wall of an airfoil. The primary current in the coil induces a current in the wall of the airfoil and the magnetic fields produced by the currents interact so as to deform the wall. U.S. Pat. Nos. 3,672,610 (Levin); 3,779,488 (Levin) and 4,399,967 (Sandorff) disclose additional aircraft deicers that utilize energized induction coils to vibrate or torque the skin on which the ice forms. In each case the electromagnetic coils or magnetostrictive vibrators are located on the inside surface of the skin that collects the ice. In the Levin et al. electromagnetic inductive deicing system of U.S. Pat. No. 3,809,341 flat buses are arranged one opposite the other with one side of each bus being adjacent an inner surface of an ice-collecting wall. An electric current is passed through each bus so as to force apart the buses and deform the ice-collecting walls. The National Aeronautics and Space Administration funded a program to test an electromagnetic coil deicer system in a Cessna Aircraft Model 206 and the program is described in *Aviation Week & Space Technology*, July 9, 1984, pages 65 and 66. The right wing of the aircraft was cut open and seven electromagnetic coils were positioned in a row along and near the inner wall of the leading edge. When the coils were energized the metal wall sections adjacent the coils were forced away from the coils and deformed. The deformation caused ice breakage. The deicing systems in these references all suffer a common disadvantage. In order to provide a set level of ice removal, a predetermined skin deflection is required. This deflection requires a large force generation from the electromagnetic system and the price for that force is high fatigue-inducing stress levels in the skin.

In addition to the performance limitations of these prior art systems, a severe limitation common to most of them is that they must be installed at the time an aircraft is built, since retrofitting them would be extremely difficult. Thus, while the art pertaining to aircraft deicing systems is a well developed one, a need still remains for further improvements, particularly for a system that can be easily installed in existing aircraft.

Further, ice accretion on aircraft predominantly initiates, accumulates, and spreads from the frontal areas or so-called leading edges of the structural surfaces. These surface areas are inherently more rigid so as to resist the various imposed air loads, either through increased material thickness, small radius of curvature, or reinforcements, than are the adjacent external skin areas where the airflow is normally parallel and the air loads generally far less. Further, the leading edges of airfoils are usually designed so as to better withstand compressive loads on the external surface as opposed to compressive loads on the inner surface. This characteristic of frontal surface rigidity is even more pronounced in the case of helicopters, where the leading edge of the metal rotors primarily consist of an enclosed D-shaped or elliptically-shaped heavy extruded spar whose wall thickness is typically ⅜" thick at the thinnest wall (not the leading edge wall). In view of the thick rotor wall and the limited empty space normally available within a rotor, a rotor-contained magnetic coil would be a very unsatisfactory means for removing ice from the front surfaces of the rotor.

SUMMARY OF THE INVENTION

It is an object of this invention to provide apparatus for separating a solid body from a resilient member.

It is a further object of this invention to utilize electrical energy to impart rapid expulsive movements to overlapping conductive members in an elastomeric member so as to violently distend the elastomeric member.

It is still another object of this invention to provide an effective aircraft deicing system which is easily installed on existing aircraft and which utilizes electrical energy to produce the ice removal.

It is another object of the invention to provide a deicing system that is especially suited for helicopter rotors.

It is a further object of the invention to provide such an aircraft deicing system which has a reduced power requirement.

It is an additional object of the invention to provide such an aircraft deicing system which has a very high instantaneous power capability.

It is another object of the invention to provide such an aircraft deicing system in which surface motion is used to dislodge the ice, but not at the expense of the deformation of structural members of the aircraft.

It is still another object of the invention to provide an aircraft deicing system with a reduced response time and may be used effectively even when the ice layer is thin.

It is yet another object of the invention to provide such an aircraft deicing system which does not have a significant adverse impact on aircraft aerodynamic performance.

An electro-expulsive separation system in accordance with this invention has a pair of opposed flexible ribbon-shaped electrically-conductive members that are electrically isolated in an elastomeric member of generally sheet-like configuration. The elastomeric material is adapted to be attached to a substrate. If the invention were used to separate molded items from a mold, for example, the elastomeric member could comprise the mold lining or part of the lining. If the invention were used for aircraft deicing purposes, the elastomer substrate could be, for example, a wing leading edge, a helicopter rotor blade, or an engine intake duct. One conductive member, the proximal one, is embedded in the elastomeric material adjacent to the substrate whereas the second member, the distal one, is embedded in the elastomeric material over the proximal member. One or more voids in the elastomeric material are positioned between the conductive members in such a way that the conductive members are not allowed to touch each other. The voids, which may be slot-like, for example, facilitate relative motion between the conductive members. The conductive members are connected in an electrical circuit so as to receive large current pulses, the current flow direction in the proximal member being opposite to the current flow in the distal member. The electrical circuit includes at least one capacitor for storage of electrical energy and componentry to alternately charge the capacitor and discharge it through the conductive members.

In operation, the opposing currents and the resulting interacting magnetic fields produce an electrorepulsive force between the proximal and distal conductive members which rapidly moves the distal member away from the proximal member and the substrate, distends the elastomeric material and tends to separate and eject any solid body thereon. As the discharge of the capacitor connected to the conductive members produces a very high instantaneous current, the proximal and distal conductors are separated very quickly and with a large force. The primary loads borne by the substrate due to this action are mainly compressive. When the substrate is an airfoil, the compressive forces are in the direction which the substrate can best tolerate them. Incorporation of preselected void regions in the elastomer between the proximal and distal conductive members enhances the distention of the elastomer, and in addition, imparts a momentary series of curvatures in the surface of the elastomer. When the separation system is used as a deicer, the series of curvatures in the surface of the elastomer tend to crack any accreted ice layers into small fragments. The power needed to charge the capacitor is relatively minor. Most importantly, ice is removed by a process which does not require deformation of the substrate.

The attainment of the foregoing and relaxed objects, advantages and features of the invention should be more readily apparent to those skilled in the art, after review of the following more detailed description of the invention, taken together with the drawings, in which:

DETAILED DESCRIPTION OF THE INVENTION

Figure 1:
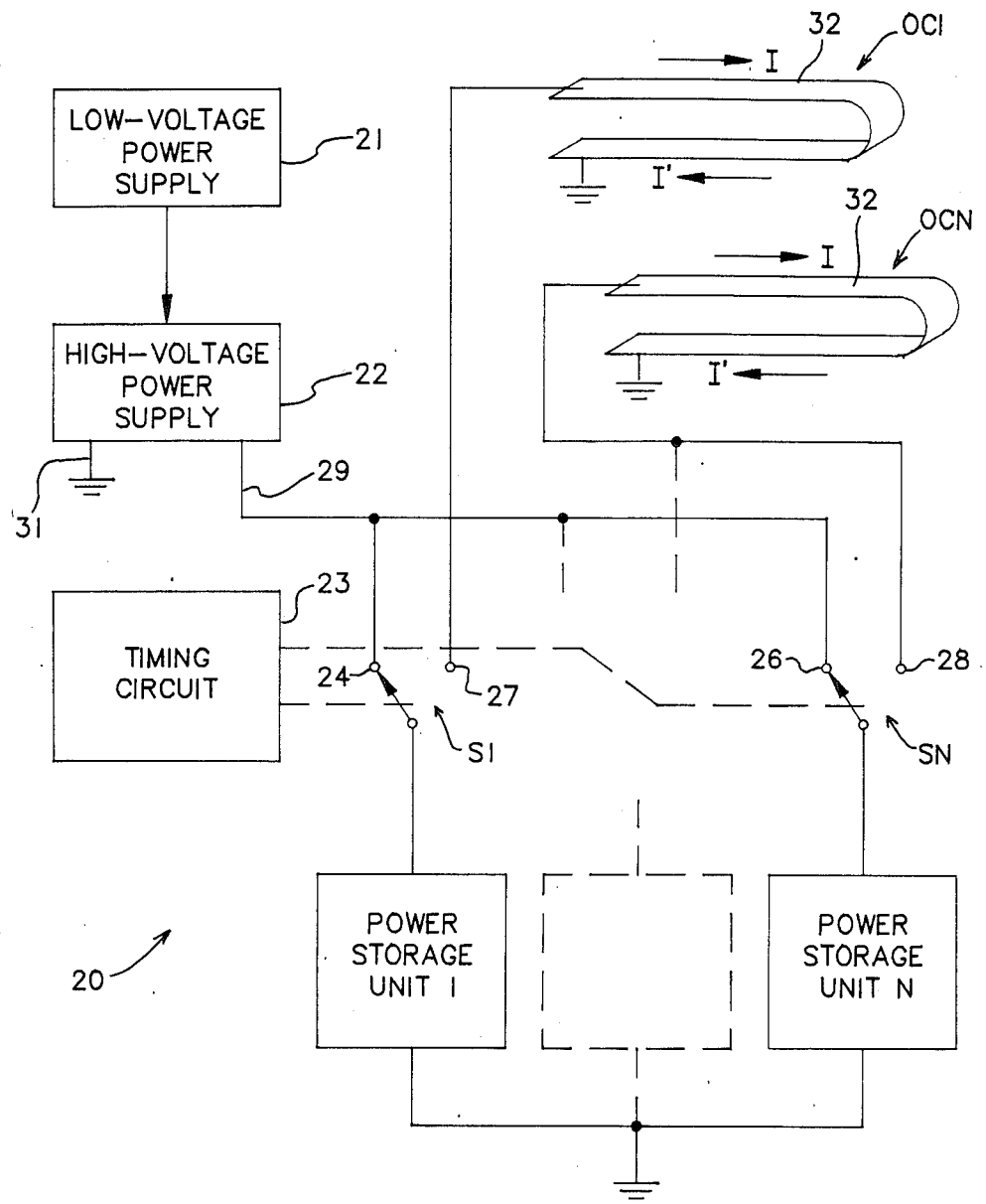
FIG. 1 is a block diagram of an electro-expulsive separation system in accordance with the invention.
Figure 2:
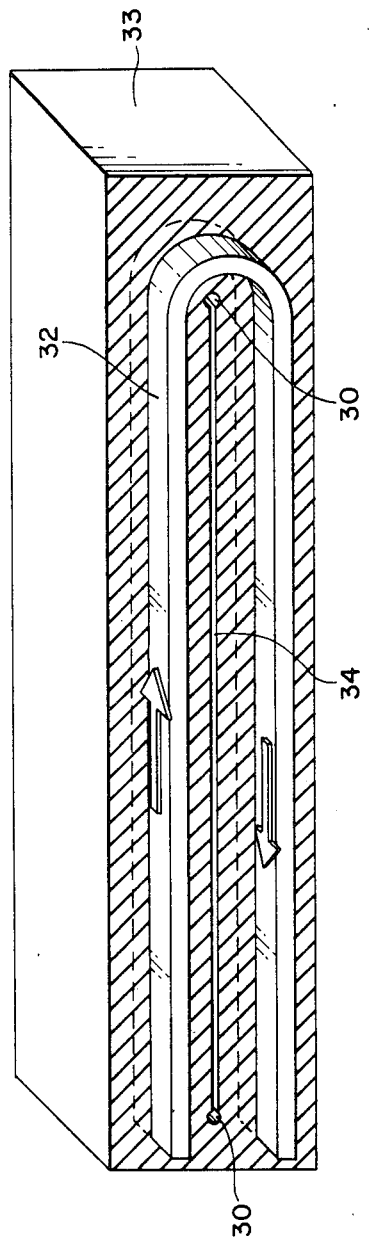
FIG. 2 is a sectional perspective view of a conductor of the FIG. 1 system showing it partially embedded in an elastomer member.

Turning now to the drawings, more particularly to FIG. 1, there is shown, in very simplified form, an electro-expulsive separation system in accordance with the invention. The system 20 includes a low voltage power supply 21 which provides power for a high voltage DC power supply 22. The system further includes a number of power storage units 1 through N and a comparable number of SPDT switches S1-SN and overlapped conductors OC1-OCN. The power storage units are each comprised of one or more parallel-connected high-voltage-capacity capacitors that are capable of storing large amounts of current. The operation of the switches S1-SN are controlled by a timing circuit 23. Switch S1 electrode 24 of switch S1 and electrode 26 of switch SN are connected to output 29 of high-voltage power supply whereas output 31 is grounded. Electrode 27 of switch S1 is connected to one end of conductor OC1 and the other end of the conductor is grounded. Electrode 28 of switch SN is connected to one end of conductor OCN and the other end of the conductor is grounded. The overlapped conductors OC1-OCN each comprise a low electrical resistance, flexible ribbon conductor 32 which is folded back on itself so as to have two closely-spaced opposed substantially parallel segments or legs. The conductors OC1-OCN are embedded in an elastomeric layer or sheet 33 (not shown in FIG. 1). A sectional perspective view (not to scale) of a single overlapped conductor is depicted in FIG. 2. As shown, the conductor 32 is only partially embedded in the elastomeric material. A void 34 in elastomeric material 33 is located between the opposed segments of conductor 32. Although it is desirable for the opposed segments of the conductor to be as close together as possible (to maximize the repelling force) the void must not be large enough to remove all elastomeric between the segments. The void facilitates the separation of the opposed segments of conductor 32 when the conductor is electrified. It is preferred that the void be entirely surrounded by elastomer. Thus, when the void is distended (when the conductor is electrified), a vacuum is formed in the void. The void aids the elastomer in returning to its relaxed state when the current pulse is terminated. It is preferred that the ends of the void be terminated in cylindrical channels or passages 30 to reduce the chances of tears developing in the elastomer when the elastomer is distended.

In operation of the system 20, timing circuit 23 throws switches S1-SN to the left position and enables high-voltage DC power supply 22 to charge power storage units 1-N. Once the storage units are charged, timing circuit 23 sequentially throws switches S1-SN to the right position. As the stored voltage is very high and the conductors OC1-OCN have a low resistance, a very high current of short duration is provided in each conductor when it is placed in parallel with a power storage unit. This current is represented by I in the upper leg of the conductor loop and I' in lower leg. As a result of these very high, instantaneous antiparallel currents, and the magnetic fields associated therewith, a force pulse with a very fast rise time is produced which separates the upper and lower legs. As the lower leg is essentially restrained by the substrate beneath the elastomeric material, it is the upper leg that does most of the moving and as the elastomeric material is distended, the body thereon is snapped and dislodged very suddenly. It is desirable to discharge the storage units sequentially so as to generate a rippling expulsive effect as the conductors are separated in sequence. The force generated between the segments of each overlapped conductor may be defined by $$F = 4I\,I'a^{-1}[\tan^{-1}ab^{-1} - \tfrac{1}{2}ba^{-1}\ln(1+a^2b^{-2})] \times 10^{-7} N/m$$

where F is the force per unit length of parallel conductor (in Newtons per meter),
  I is the current (in amperes) flowing in one direction,
  I' is the current (in amperes) flowing in the opposite direction,
  a is the width (in meters) of the conductors, and
  b is the distance (in meters) between the parallel conductor segments.

As an example, the mutually repulsive force generated between two parallel ribbon conductors whose width is 0.300 inch (0.079 mm) and separated by a dielectrically filled gap of 0.079 inch (0.2 mm), and instantly conducting 3000 amperes, has a magnitude of approximately 2430 pounds per lineal foot ($35.5 \times 10^3$ Newtons per meter).

Figure 3:
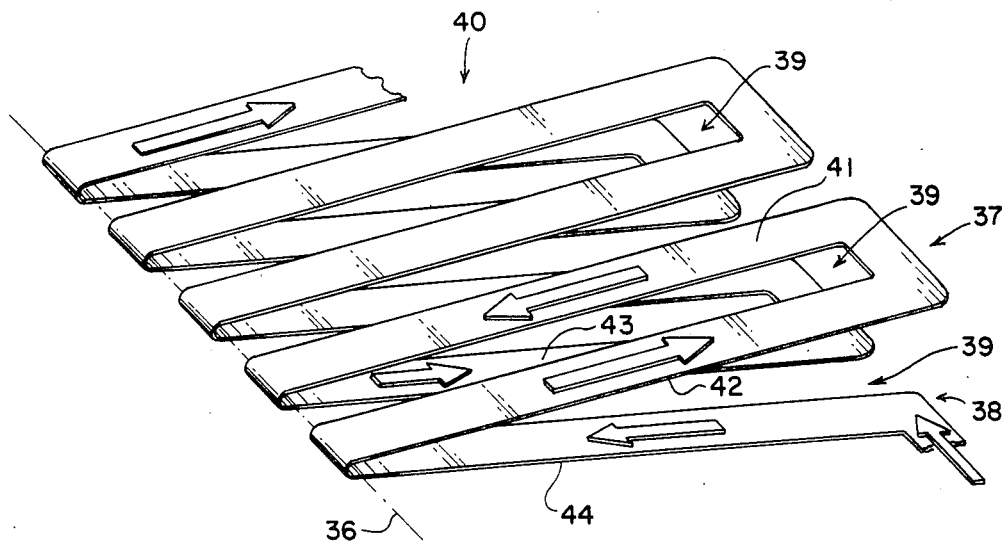
FIG. 3 is a perspective view of an overlapped serpentine ribbon conductor suitable for covering a larger area than the conductor of FIGS. 1 and 2.

FIGS. 1 and 2 depict an expulsive-force producing ribbon conductor in its most simple form. FIG. 3 shows a flexible ribbon conductor 40 having a pattern that is better suited for a large surface than conductors OC1-OCN in FIG. 1. The zig-zag or serpentine shaped ribbon conductor has been folded into two sections 37, 38 along axis 36. For ease of illustration, the elastomeric material has not been shown in this figure and sections 37, 38 have not been illustrated parallel (a desired arrangement for generating a constant force along the conductor). Further, the gaps 39 have been shown extra large so that the serpentine pattern can be more readily observed. The arrows depict one possible current flow path through the ribbon conductor. It is to be noted that the current flow in a lower conductor segment is antiparallel to the current flow in the overlapping conductor segment. More specifically, the current direction in conductor segment 44 is antiparallel to the current direction in overlapping conductor segment 42, the current direction in segment 43 is antiparallel to the current direction in segment 41, etc. Thus, when a storage unit is discharged through conductor 40 and a massive current flows through the conductor, conductor segment 44 is instantaneously and forcefully repelled from conductor segment 42, conductor segment 43 is repelled from segment 41, etc.

Figure 4:
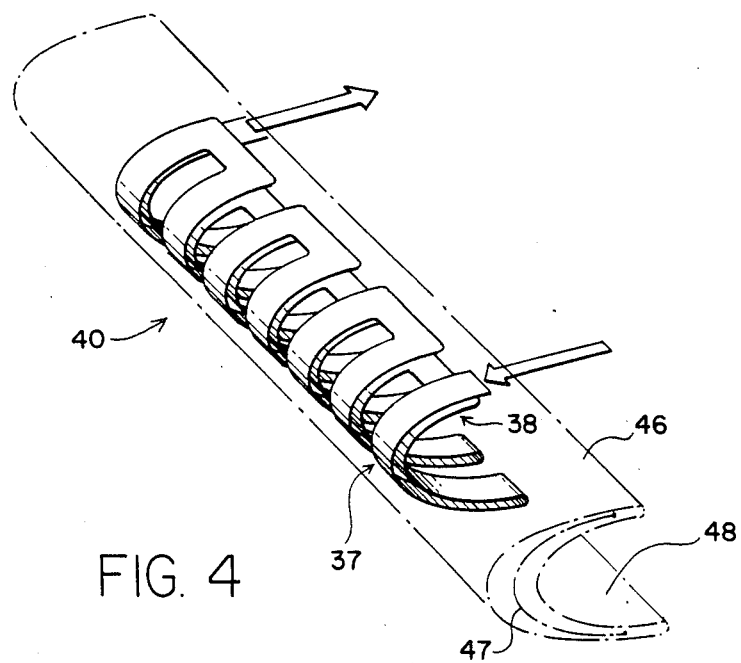
FIG. 4 is a perspective view of the conductor of FIG. 3 embedded in a flexed elastomer sheet.

FIG. 4 is a perspective view of flexible ribbon conductor 40 embedded in an elastomeric sheet 46 (not to scale). Elastomeric void 47 is situated between sections 37 and 38 of conductor 40 and facilitates separation of the two sections when a storage unit is discharged into the conductor. FIG. 4 shows conductor 40 and elastomer 46 flexed in a curved shape suitable for bonding or otherwise attaching the concave surface 48 to a substrate such as the leading edge of an airfoil.

The following factors should be considered in the selection of material for the flexible ribbon conductors: low electrical resistance, high current capability, flexibility and bending fatique strength, corrosion resistance, tensile strength, and economics. Copper other than OFC (oxygen-free copper) is not especially suited as it tends to work harden. A group of more suitable conductor material would include selected alloys of copper, silver, as well as those of tantalum. A ribbon conductor need not be made from a single piece of material and each and every segment need not have a corresponding overlapped or opposed segment. The conductor may be comprised of many joined electrically-conductive sections, braided wires, etc. The elastomeric material should be selected on the basis of elastic properties, fatigue resistance, tear strength, cold temperature resilience, and dielectric strength. Some of the many materials that may be used for the bedding elastomer are neoprene, silicone or polyurethane. If the elastomeric material has some filler which renders it a poor electrical insulator, the ribbon must be coated or covered with a flexible electrical insulator before it is embedded in the electrically-conductive elastomer. For applications where severe erosion is anticipated, such as rain and sand erosion, which might be the case with helicopters, it is desirable that the outer layer 69 (FIG. 5) of the embedding elastomer, as a minimum, or the entire bulk of the elastomer be comprised of an erosion resistant and resilient elastomer such as some commercially available polyether and polyester versions of polyurethane.

The ribbon/elastomer assemblies depicted in FIGS. 2 and 4 only have one void separating the opposed conductor segments. It is to be understood that multiple voids may be used and that different elastomeric distention patterns can be produced by varying the number, size and placement of the voids with respect to the ribbon conductors. The slot-shaped void is preferred as it minimizes the spacing between opposed conductor segments. Other void shapes could possibly reduce the expulsive force generated. It is preferred that the voids be entirely surrounded by the elastomeric material so as to make use of the void vacuums when the voids are distended. As stated before, the void vacuums hasten the return of the elastomer to its relaxed state after the conductors receive a current pulse.

Figure 5:
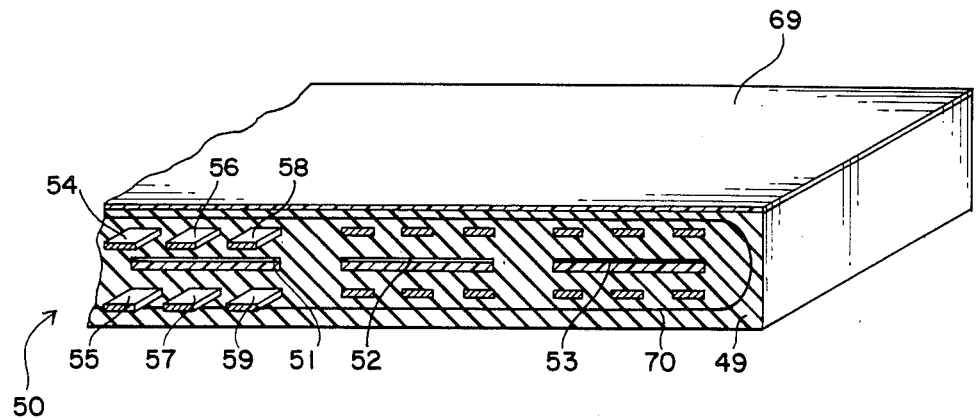
FIG. 5 is a sectional perspective view of a conductor/elastomer assembly employing multiple void/conductor groups.
Figure 6:
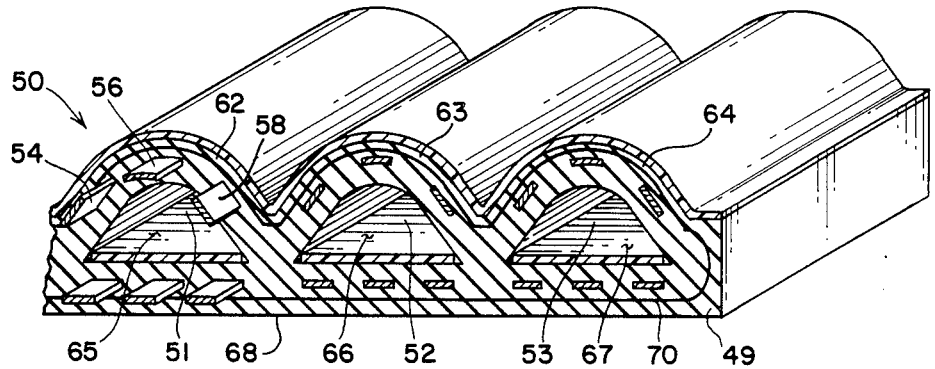
FIG. 6 is a sectional perspective view of the assembly of FIG. 5 when the conductors are electrified and portions of the elastomer are distended.

FIGS. 5 and 6 depict a portion of a ribbon/elastomer assembly 50 having a repetitive void/conductor layout. The assembly is adapted to be bonded to a substrate at surface 68 (FIG. 6). Although the surface is depicted as planar, it is to be understood that resilient embedding material 49 will readily flex, and conductor/elastomer assembly 50 may be bonded to curved substrates such as the leading edge of a wing, a helicopter rotor, etc. FIG. 5 shows the assembly 50 in a relaxed non-electrified state, whereas FIG. 6 illustrates the same assembly when the conductors are electrified and opposed conductors are repelling each other. Voids 51–53 in elastomer 49 are each sandwiched by six conductor segments. The voids, which are slot-shaped in the relaxed state, have a rectangular shape in plan view and the voids are substantially parallel. Void 51, for example, is sandwiched between flexible ribbon conductor segments 54–59 that are substantially parallel. Upper segments 54, 56 and 58 are situated as close as possible to lower segments 55, 57 and 59, respectively, to maximize the repelling force between segments when the segments are electrified as that force is inversely proportional to the separation distance. The ends of the segments are serially electrically interconnected in such a way that the current passing through segments 54, 56 and 58 is antiparallel to the current passing through segments 55, 57 and 59, respectively. For example, this current flow path may be achieved by electrically connecting the distal ends of segments 54 and 55 together, connecting the proximal ends of segments 55 and 57 together, connecting the distal ends of segments 56 and 57 together, connecting the proximal ends of segments 56 and 58 together, etc.

In the operation of the conductor/elastomer assembly 50 of FIG. 5, the sudden massive current flow through the low-resistance embedded conductors arising from the time discharge of the capacitors, the detailed operation of which is explained in subsequent sections, produces an immediate and very large repellent force between the opposed conductor segments. Movement of the lower segments (55, 57, 59 and others) is reacted by the substrate to which the elastomeric material is bonded, generally as a compressive force normal to the substrate and in a direction to which the structure was designed to resist, causing a compressive force on the elastomer to effectively constrain these conductors. The upper conductor segments (54, 56, 58, etc.), by mutual repulsion with the lower segments, are suddenly and vigorously propelled outwardly until they are finally restrained by the distended (see FIG. 6) resilient elastomer portions 62–64. In applications where the conductor/elastomer assembly is used as a deicer, the ridges that are formed in elastomer 49 are very beneficial in cracking the accreted ice on the upper surface of the elastomer, and the expulsive force of the elastomer literally throws the cracked ice from the elastomer. Depending on the magnitude of the discharged voltage and the resistance of the conductor, the large current flow during the onset of the discharge process may easily be on the order of $10^3$ amperes. As the duration of the current flow is on the order of $10^{-3}$ seconds, the total energy expended is not appreciable; however, the instantaneous expulsion force is very high. Assuming a stored voltage of $10^3$ volts and an instantaneous current of $10^3$ amperes, the resulting impulse power is equivalent to over 1300 horsepower, more than enough power to overcome the inertia and resilient resistance of the ice, elastomer and conductor. During the distention cycle, the voids 51–53 are greatly enlarged and internal vacuums are created therein. The inherent elastic resilience of the conductor-embedding elastomer 49 and these void vacuums provide the restoring force necessary to return the elastomer to its fully relaxed state (FIG. 5). When an assembly 50 is bonded to the leading edge of a typical helicopter rotor, the distention cycle is completed so fast that the distention produces no discernible aerodynamic degradation when the rotor is in operation.

The voids 51–53 may be achieved by inserting thin release films between the conductor segments at the locations where the voids are desired. The elastomer does not bond to the release films, and thus when the elastomer is distended, a cavity or void is formed between elastomer portions 62–64 and release films 65–67, respectively. Some of the materials that are suitable for the release films are polyethylene, polypropylene and perfluoronated polyethylenes, reinforced and nonreinforced.

Figure 7:
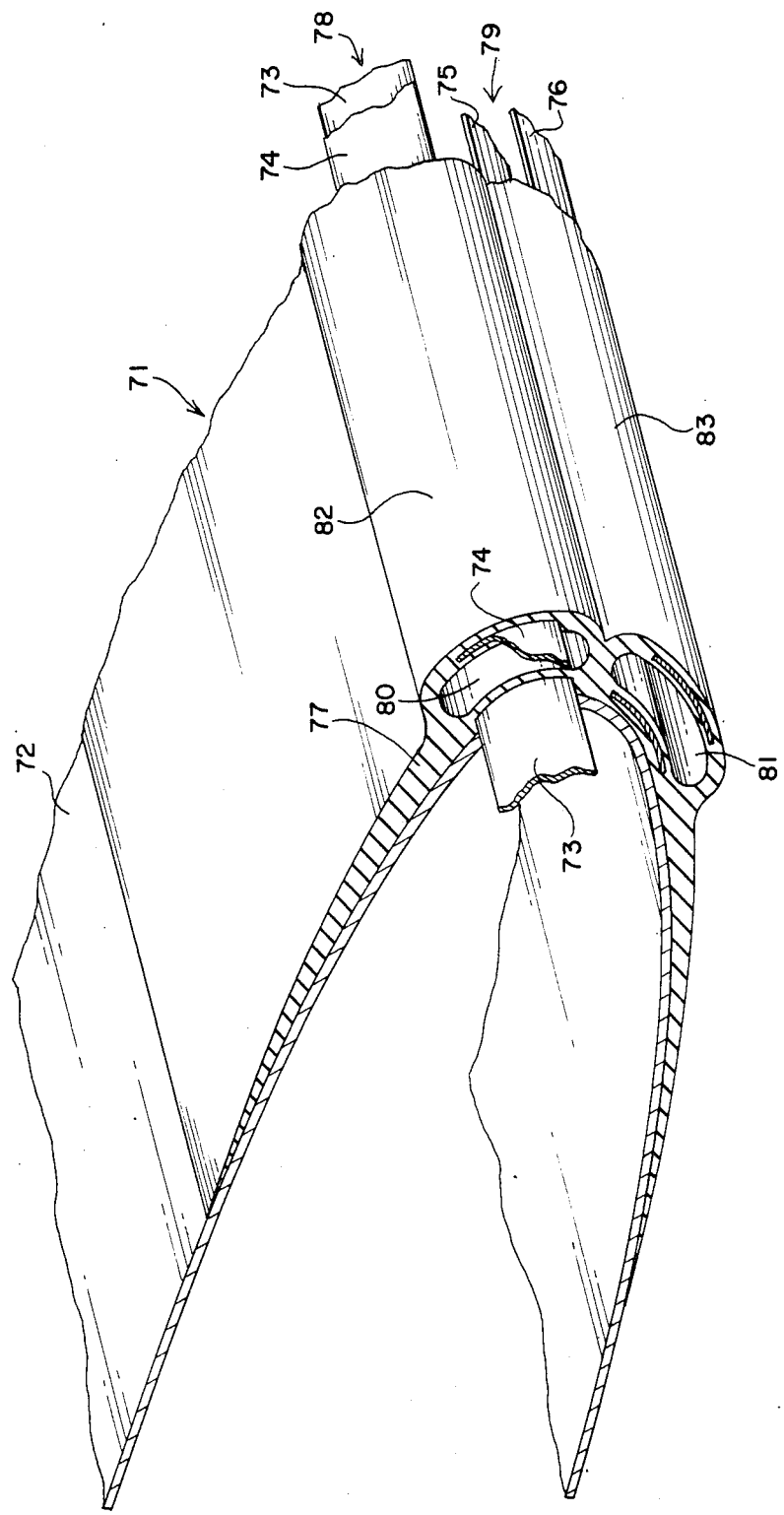
FIG. 7 is a sectional perspective view of a deicing boot in accordance with the invention.

FIG. 7 is a sectional perspective view of a deicer boot made in accordance with the invention. Boot 71 is adapted to be bonded or otherwise attached to the leading edge of an airfoil 72. The boot includes side-by-side flexible ribbon conductors 78, 79 which are embedded in an elastomer sheet 77. Conductor 78 comprises opposed segments 73, 74 which are serially and electrically connected so that current flow in segment 73 is antiparallel to current flow in segment 74. Likewise, conductor 79 comprises segments 75, 76 which are serially and electrically connected so that current flow in segment 75 is antiparallel to current flow in segment 76. Conductor segments 73 and 74 sandwich a sealed elastomer void 80 whereas conductor segments 75 and 76 are arranged on opposite sides of elastomer void 81.

Figure 8:
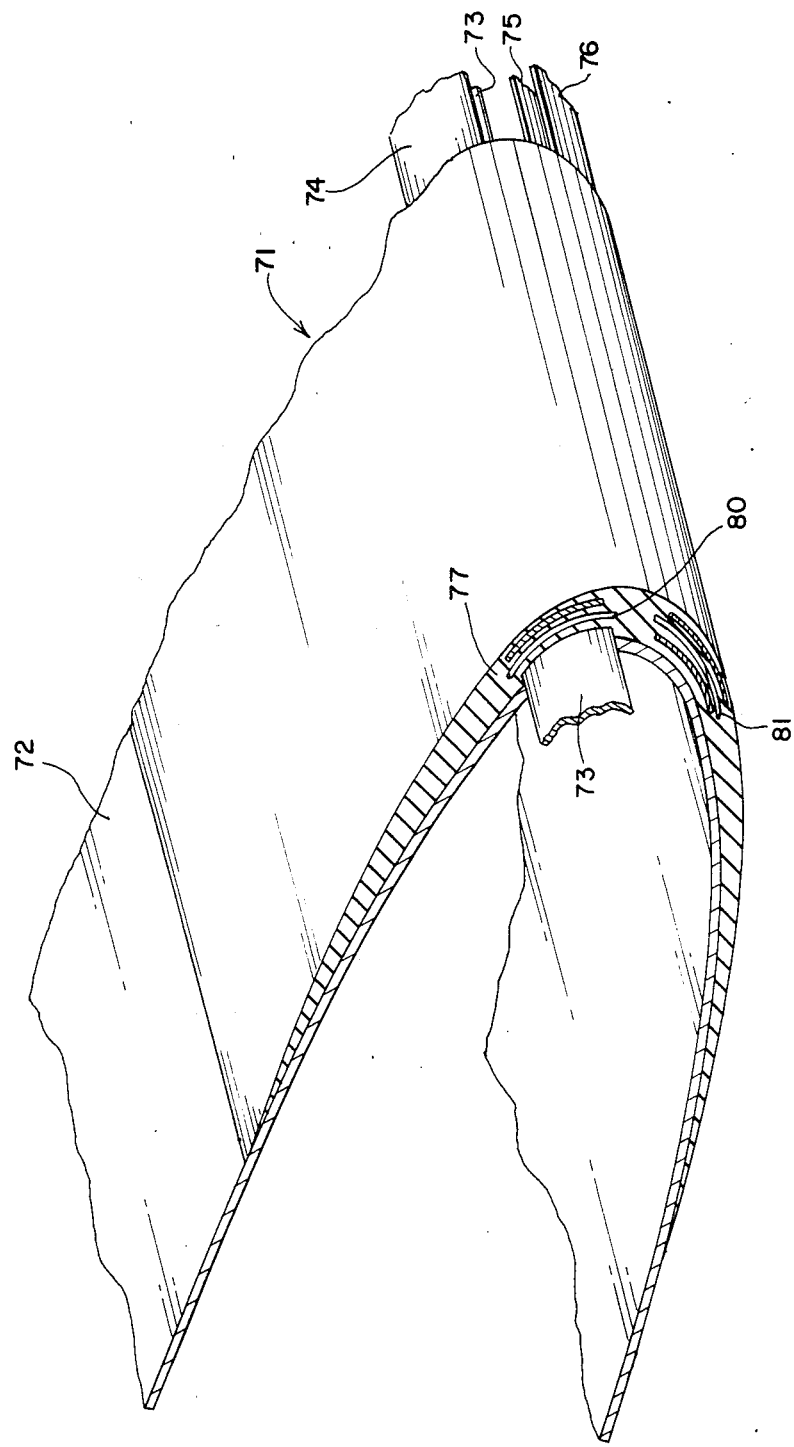
FIG. 8 is a perspective view of the deicing boot of FIG. 7 when it is in the relaxed state.

When a high current pulse from a storage unit is supplied to conductor 78, segments 73 and 74 suddenly and vigorously repel each other so that elastomer portion 82 is distended and any ice gathered thereon is cracked and expulsively ejected. Likewise, when a high current pulse is received by conducotr 79, conductor segments 75 and 76 are rapidly and forcefully separated so that elastomer portion 83 is projected causing an almost instantaneous very high G force to expel the ice thereon. As the high current pulses supplied to the conductors are of extremely short duration, the elastomer is only distended for a short period of time. During the majority of the time, the elastomer 77 has the contracted and streamlined configuration shown in FIG. 8 which has very slight effect on the aerodynamic characteristics of the airfoil 72. Although only two conductors are depicted in FIGS. 7 and 8, it is to be understood that the boot may include additional conductors more remotely situated from the center line of the leading edges, and the various conductors may be energized sequentially as individual conductors or in groups.

Figure 9:
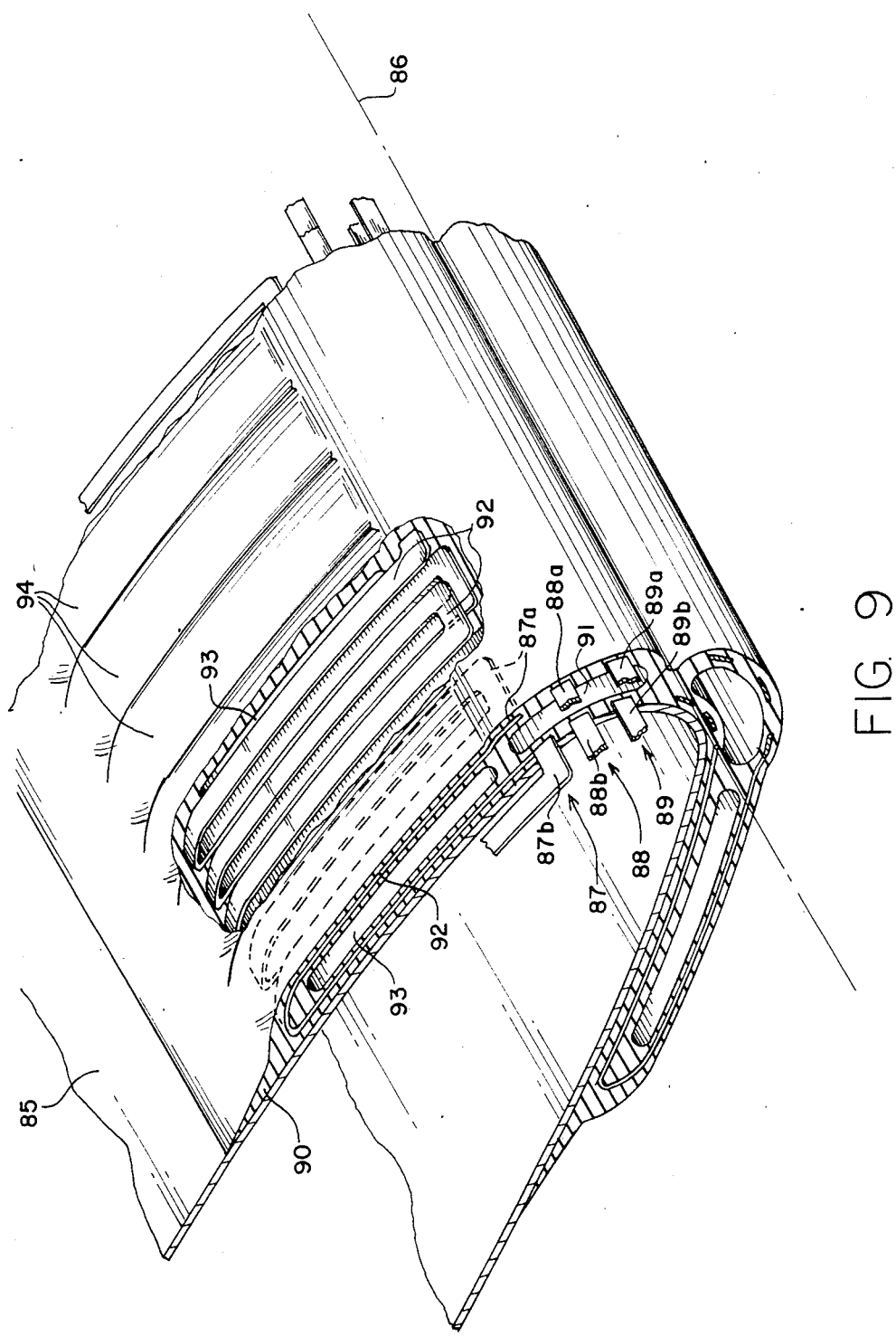
FIG. 9 is a sectional perspective illustration of still another deicing boot in accordance with the invention.

FIG. 9 is a sectional perspective of still another deicer boot incorporating the subject invention. The boot is bonded or otherwise attached to the leading edge of an airfoil 85. The boot is symmetrical about leading edge centerline 86 so only one-half of the boot will be described in detail. Three flexible ribbon conductors 87-89 are embedded in an elastomer sheet 90. The segments 87a and 87b of conductor 87 are identical in configuration, opposed to each other, and electrically connected at one end by a jumper or a loop so that the current flow in segment 87a will be in the opposite direction to the current flow in segment 87b. The segments 88a and 88b of conductor 88 are identical in configuration, opposed to each other, and electrically connected at one end. Likewise, conductor segments 89a and 89b are identical in configuration, opposed to each other, and electrically connected at one end. Conductors 88 and 89 are basically linear whereas conductor 87 is serpentine. An elastomer void 91 separates segments 88a, 88b, 89a, and 89b and a small portion of segments 87a and 87b. The longitudinal axis of void 91 is approximately parallel to the leading edge centerline 89. A separate elastomer void is associated with each serpentine loop 92 of conductor 87. One such void is shown at reference number 93. Void 93 separates a segment 87a loop from an opposed segment 87b loop. The other voids associated with conductor 87 serve the same function and the voids are each isolated from an adjacent one by a narrow elastomeric barrier. The voids have longitudinal axes that are approximately parallel and all normal to the longitudinal axis of void 91.

In the operation of the FIG. 9 embodiment, the conductors 87-89 are pulsed sequentially, starting with conductor 89 and ending with conductor 87. This results in an expulsive force that ripples in an airflow-wise direction that begins at the centerline 86 and moves downstream. FIG. 9 shows all of the conductors 87-89 in an electrified state with the elastomer voids distended. As apparent in FIG. 9, when conductor 87 is energized, a series of bubbles 94 are formed on the outer suface of elastomer 90. These distentions as well as the distention of void 91 (when conductors 88 and 89 are energized) are very effective in cracking and ejecting ice from the outer surface of the elastomer.

In explanation of the operation of the supportive electronic circuitry of this electro-expulsive separation system, turn again to FIG. 1. Note that power storage units 1 through N are charged by a high voltage power supply 22, and then on command from timing circuit 23, the low-resistance, flexible, overlapped conductors OC1 through OCN are sequentially conducted to power storage units 1 through N, respectively. When each connection is made, a high instantaneous current flows through the conductor producing a great repulsive force between the opposed conductor segments.

Figure 10:
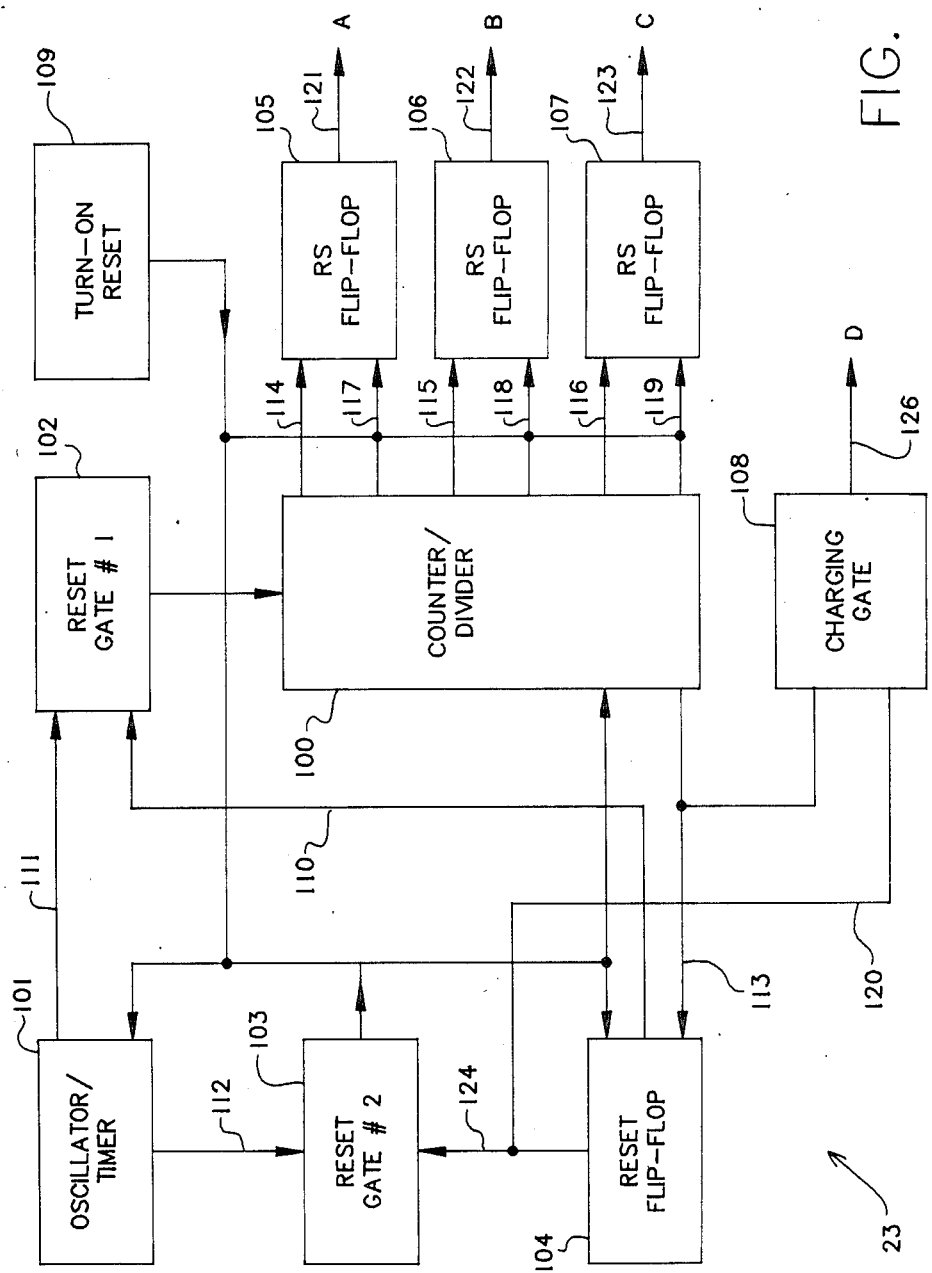
FIG. 10 is a block diagram of the timing circuit for the electro-expulsive separation system.

FIG. 10 is a block diagram of the timing circuit 23 in FIG. 1, used to control the charging and discharging of the storage units 1-N. The timing circuit comprises a counter/divider 100, an oscillator timer 101, reset gates 102, 103, a reset flip-flop 104, three RS flip-flops 105-107, a charging gate 108 and a turn-on reset 109. Oscillator timer 101 generates a series of clock pulses at output 111 that are fet to reset gate #1, and subsequently it generates a reset function pulse from output 112 which is fed to one input of reset gate #2. Reset gate #1 controls the flow of clock pulses to counter/divider 100 which is responsible for generating pulses to control the sequential discharging of the storage units. After the sequential pulses are generated, counter/divider 100 releases a pulse on output 113 to one input of reset flip-flop 104. As depicted, the timing circuit has only circuitry for sequentially energizing three overlapped conductors. It is to be understood that the number of components may be decreased or increased to accommodate a different number of ribbon conductors.

In operation, when the separation system is turned on, a reset pulse is generated by turn-on reset 109 which resets the flip-flops 105-107, oscillator/timer 101, reset flip-flop 104, and counter/divider 100. With these units reset, clock pulses from oscillator/timer 101 are allowed to pass through reset gate #1 to counter/divider 100. As a result of receiving these clock pusles, counter/divider 100 sequentially generates three set pulses on outputs 114-116 and sequentiallly generates three reset pulses on outputs 117-119. These pulses from counter/divider 100 cause flip-flops 105-107 to each release a single pulse in staggered fashion from flip-flop outputs 121-123. These flip-flop pulses control the onset of the discharge of three storage units and cause them to energize the respective conductors in sequential order. After the three discharge-control pulses are released from flip-flop outputs 121-123, a pulse is sent to flip-flop 104 on output 113 of counter/divider 100 which toggles the flip-flop and causes a ONE pulse to be fed to one input of reset gate #2 via output 124 of flip-flop 104. After a predetermined period a ONE pulse from oscillator/timer 101 reaches the other input of reset gate #2 and reset gate #2 generates a ONE pulse which resets oscillator/timer 101, counter/divider 100, and reset flip-flop 104. When the control pulse from output 113 of counter/divider 113 is released, flip-flop 104 is toggled and both inputs of charging gate 108 have the same binary state. The output of gate 108 changes states when this happens and the resulting pulse allows all of the power storage units to begin charging again. The charge cycle is terminated when the reset pulse from reset gate #2 toggles flip-flop 104. Switches (not shown in FIG. 10) permit circuit to be operated in an automatic reset or manual "test" mode (see switch 185 in FIG. 12).

Figure 11:
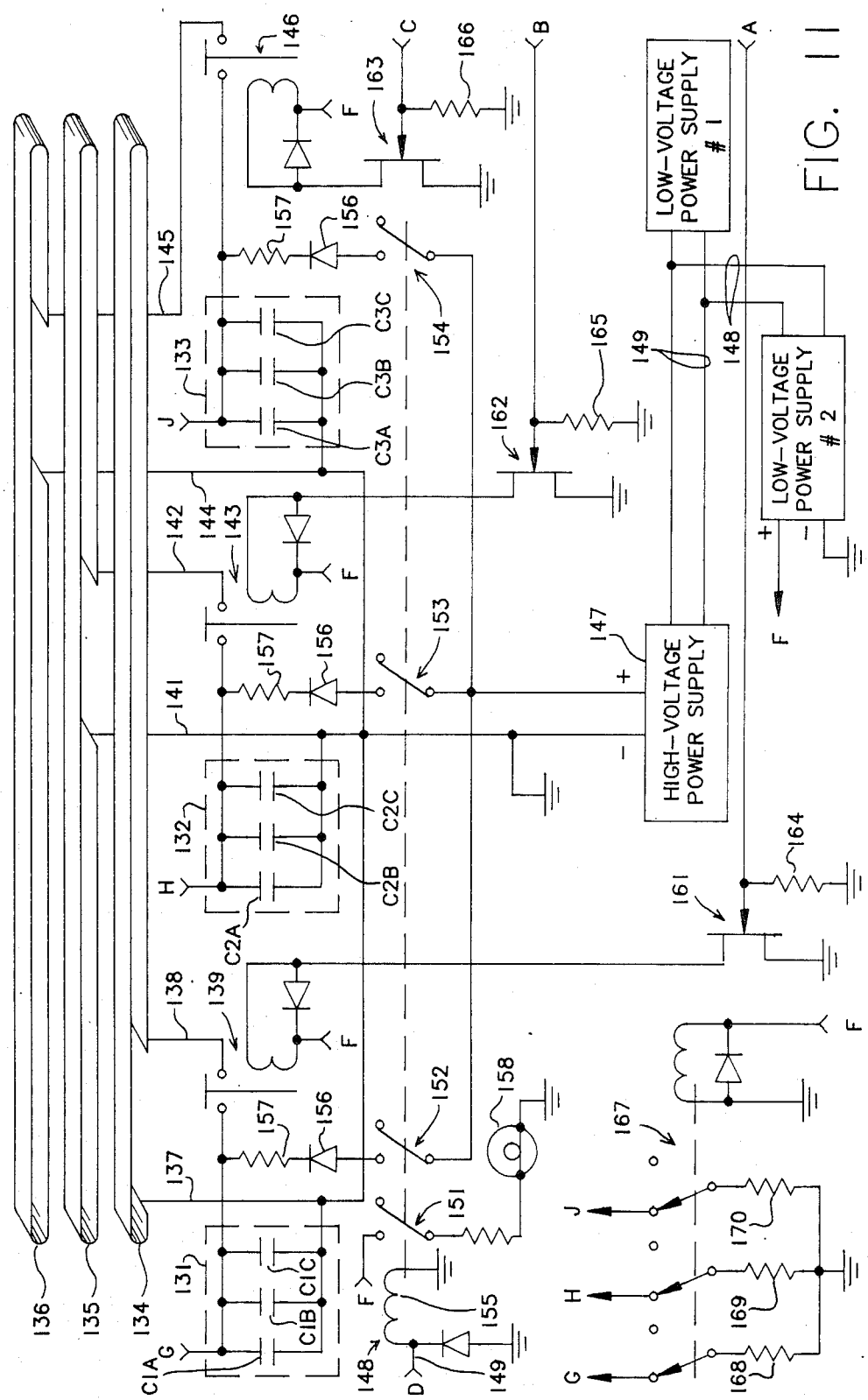
FIG. 11 is a schematic diagram of part of the electronic circuit for the separation system.

FIG. 11 shows part of the separation system 20 in more detail. More specifically, FIG. 11 depicts the apparatus for charging the storage units and the switches for discharging these units across the overlapped ribbon conductors. Power storage units 131, 132 and 133 comprise high-voltage, high-current-capacity capacitors C1A-C1C, C2A-C2C, and C3A-C3C, respectively. Storage unit 131 is coupled to overlapped ribbon conductor 134 by means of lines 137, 138 and relay 139. Storage unit 132 is coupled to conductor 135 by means of lines 141, 142 and relay 143; and storage unit 133 is coupled to ribbon conductor 136 by means of lines 144, 145 and relay 146. Low-voltage power supply No. 1 provides electrical power for low-voltage power supply No. 2 and high-voltage power supply 147 via lines 148 and 149, respectively. For simplicity, the elastomeric material has not been shown in this figure. In an aircraft, for example, low-voltage power supply No. 1 might be an alternator supplying 220 VAC, 400 Hz electrical power. High-voltage power supply 147 draws from low-voltage power supply No. 1 and generates a high DC voltage that is used to charge storage units 131, 132 and 133. When low-voltage power supply No. 1 is an AC supply, power supply 147 need merely comprise a step-up transformer, and a rectifier. Low-voltge power supply No. 2 draws power from low-voltage power supply and generates a very low DC voltage to supply power for the relays and the timing circuit. In one system made in accordance with the invention, high-voltage power supply 147 generated 1,200 VDC and low-voltage power supply No. 2 generated 15 VDC. The amount of current that may be discharged by a single capacitor is limited. In situations where that current is insufficient to generate a desired expulsive force, additional capacitors may be provided in shunt connection. The Sprague Electric Company Type 681P metallized energy storage capacitors have energy densities of 80 joules per pound and are designed for use at discharge rates of up to 10 per second and peak discharge current up to 1360 amperes. In one system made in accordance with the invention, three Type 681P, 80 microfarad, 1500 working VDC, 1360 amperes maximum peak discharge capacitors were employed in each storage unit. It is to be understood that more than or less than three capacitors may be employed in a storage unit. The number will be influenced by expulsive force requirements, cost, volume constraints, etc.

Relay 148 controls the charging of the capacitors. Relay 148 has a four-pole, double-throw switch configuration with sections 151-154. When relay solenoid 155 is not energized, the switches of sections 151-154 assume the right-most position. When a solenoid-energizing pulse is received on lead 155 from the charging gate in the timing circuit, the switches move to the left-most position and enable the storage units to receive the output of high-voltage power supply 147. The current from the power supply passes through a decoupling diode 156 and a current-limiting resistor 157 before reaching the storage units. The charging time of a storage unit is a function of the time constant, RC, of the charging system (where R is the value of the current-limiting resistor and C is the capacitance of all of the capacitors in the storage unit). Switch section 151 controls the illumination of a lamp 158. When relay solenoid 155 is energized, current flows through and illuminates lamp 158 (an LED, for example). Lamp 158 thus provides a visual indication each time the capacitors in the storage units are charged.

In operation of the separation system 20, the ribbon conductors 134-136 are pulsed sequentially to create a rippling expulsive effect on the ice collected on the elastomeric material. The electrical energy stored in the capacitors C1A-C1C, C2A-C2C and C3A-C3C is transferred to the ribbon conductors by heavy duty relays 139, 143 and 146. One type of relay suited for this large current switching task is the automobile starter solenoid switch. Experiments were conducted using semiconductor controlled rectifiers (SCRs) in place of relays 139, 143, and 146. The SCRs selected had the largest current capacity of those that could be found on the commercial market. The SCRs were found to be unsatisfactory. The SCRs either failed the first time that they were triggered or a few cycles later. Relays 139, 143, and 146 are respectively activated by field-effect transistors (FETs) 161-163. The gate electrodes of the FETs 161-163 are coupled to the outputs 121-123, respectively, of the flip-flops 105-107 in the timing circuit. The gate resistors 164-166 bias the FETs 161-163 off until a positive (ONE) pulse is received from a timing circuit flip-flop. When a ONE pulse is received at the gate electrode, the FET is turned on and the relay solenoid is energized. The energized solenoid closes the switch contacts and allows the associated storage unit to discharge through the coupled ribbon conductor. The amount of discharge current through the conductor is a direct function of the stored voltage and an inverse function of the resistance of the conductor.

Relay 167 serves a safety function. It has a three-pole, double-throw switch configuration and one electrode of each switch section is coupled to a storage unit. When the power to the deicing system is turned off, relay 167 connects storage units 131-133 to ground resistors 168-170, respectively. When this happens, all of the capacitors are discharged to ground and no high voltage remains in the circuit.

Figure 12:
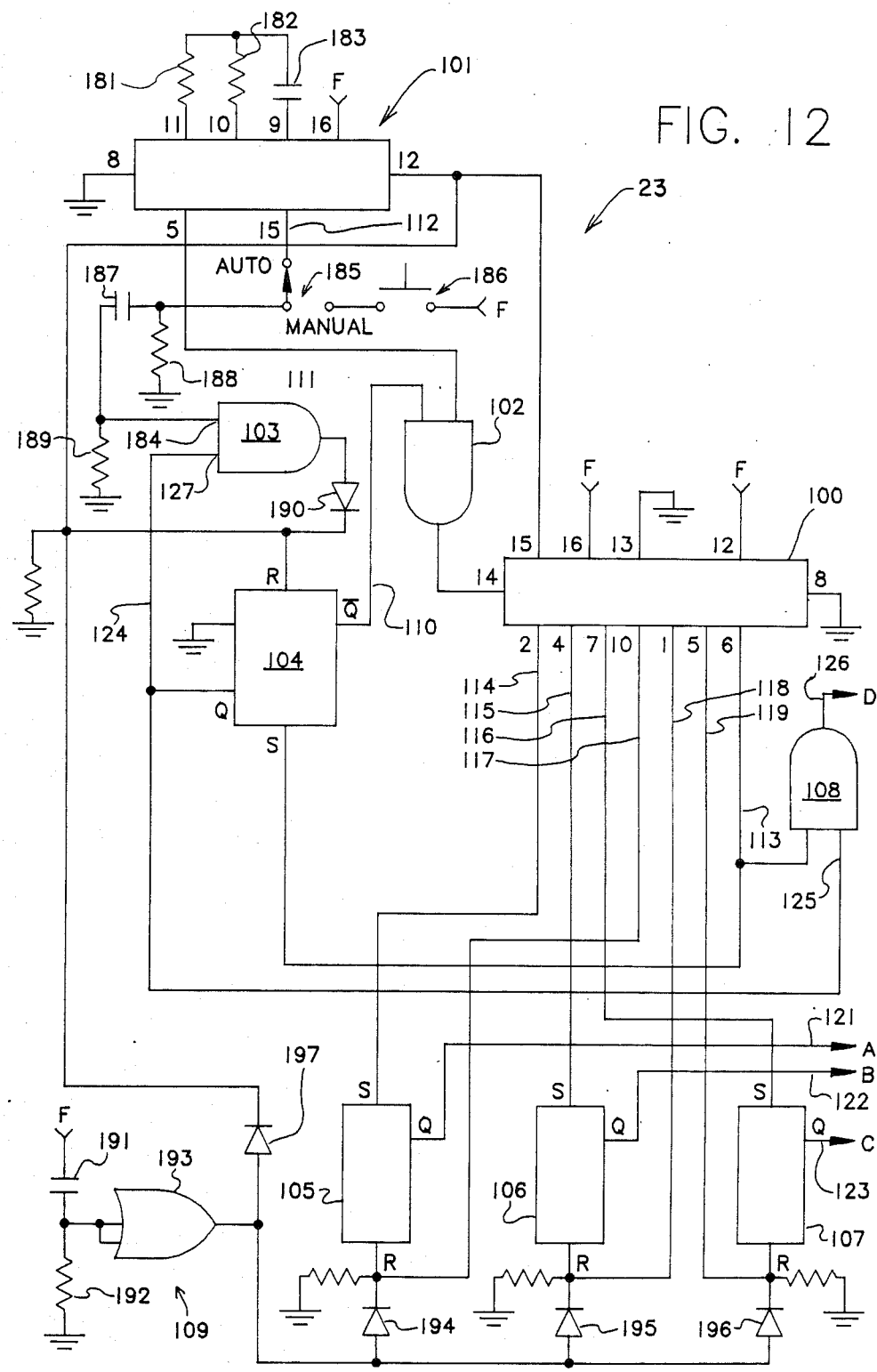
FIG. 12 is a schematic diagram of the timing circuit.

The timing circuit 23 is shown in more detail in FIG. 12. Corresponding reference numbers have been used for corresponding elements. Clock pulses and delayed reset pulses are provided by the oscillator/timer 101 which is implemented with a CD4060 CMOS 14-stage ripple-carry binary counter/divider and oscillator integrated circuit. The values of resistors 181, 182 and capacitor 183 determine the oscillator frequency. Reset gate 102 is implemented by an AND gate. The oscillator pulses (one pulses) generated by the oscillator/timer 100 are fed to one input of reset gate 102 via lead 111 and when the output of reset flip-flop 104 is a one, the oscillator pulses pass through the reset gate 102 to counter/divider 100. The counter/divider generates three sequential set pulses, three sequent reset set pulses and a pulse needed to reset various elements of the timing circuit 23. The counter/divider is implemented with a CD4017 CMOS decade counter/divider integrated circuit. Outputs 114, 115 and 116 of the counter/divider are connected to the S (set) inputs of RS flip-flops 105-107, respectively. Counter/divider 100 outputs 117-119 are coupled to the R (reset) inputs of RS flip-flops 105-107, respectively. Output 191 is connected to the S input of reset flip-flop 104 and one input of charging gate 108, and AND gate. After counter/divider 100 is reset and clock pulses from oscillator/timer 101 pass through gate 102, counter/divider 100 sequentially genertes a single pulse to each flip-flop S input and sequentially generates a single pulse to each flip-flop input. These sequential pulse groups have the effect of sequentially toggling flip-flops 105-107 so as to first produce a ONE pulse of flip-flop output 121, followed by a ONE pulse on flip-flop output 122, and lastly a ONE pulse on flip-flop output 123. The three generated pulses have front edges time-displaced by a period equivalent to the period of a clock pulse. The pulses on lines 121-123 sequentially turn on FETs 161-163, respectively, sequentially close the switches of relays 139, 143, and 146, respectively, and sequentially discharge storage units 131-133, respectively, into ribbon conductors 134-136, respectively. After the storage units are sequentially fired, the counter/divider 100 releases a ONE pulse on line 113 to one input of charging gate 108 and the S input of flip-flop 104. In response, flip-flop 104 toggles and produces a ONE at output Q and a ZERO at output $\bar{Q}$. The ZERO on line 110 has the effect of shutting off gate 102 and preventing clock pulses on line 111 from leaving the gate and reaching counter/divider 100. Line 120 interconnects the Q output of reset flip-flop 104 and input 125 of AND gate 108. When the ONE pulse is released on line 119 and flip-flop 104 toggles, the AND gate 108 sees ONEs on both inputs and produces a ONE output pulse on line 126 which energizes relay 155 and starts the charging of storage units 131-133. The charging cycle is terminated when flip-flop 104 is reset.

Line 124 interconnects the $\bar{Q}$ output of reset flip-flop 104 to input 127 of reset gate #2, an AND gate. Repeating, the one pulse on line 113 from counter/divider 100 toggles flip-flop 104 and produces a ONE pulse at the $\bar{Q}$ output. As the $\bar{Q}$ output is a ONE, the input 127 of reset gate 103 also sees a ONE. Reset gate 103 remains closed until another ONE pulse is received at input 184. The oscillator/timer 101 provides a reset pulse on line 112 at a predetermined time. Single-pole, double-throw switch 185 controls the reset mode of timing circuit. The circuit may either be operated in an automatic or manual mode. With mode switch 185 set in the automatic position as shown, the reset pulse on line 112 is capacitively coupled through capacitor 187 to input 184. Resistors 188 and 189 ensure that there is no DC voltage across capacitor 187 and that the input 184 is at ground potential absent the presence of a reset pulse. When the reset pulse arrives at input 184, a ONE reset pulse is coupled through diode 190 to the R input of flip-flop 104, terminal 12 of oscillator/timer 101, and terminal 15 of counter/divider 100.

The resetting functions are as follows: first reset flip-flop 104 changes state causing Q to be a ZERO and to $\bar{Q}$ be a ONE. The ONE on line 110 has the effect of opening gate 102 to pass through ONE clock pulses from oscillator/timer 101. Resetting oscillator/timer 101 changes all outputs of the oscillator/timer to ZERO and restarts the oscillator/timer to generate ONE pulses at line 111. Resetting the counter/divider 100 changes all outputs to ZEROs and restarts the counter/divider. When the counter/divider 100 is reset and a ZERO is produced at line 113, gate 126 is closed, the gate output on line 126 is changed to a ZERO, and the charging cycle for the storage units is stopped. After reset occurs, the counter/divider 100 starts repeating the production of the sequential set and reset pulses that toggle flip-flops 105-107 and cause the storage units to be discharged into the ribbon conductors.

Turn-on reset circuit 109 comprises a capacitor 191, a resistor 192 and an OR gate 193. When circuit power is initiated, the charging of capacitor 191 generates a positive-going (ONE) pulse which is buffered by OR gate 193, coupled to flip-flops 105-107 by diodes 194-196, respectively, and coupled to flip-flop 104, oscillator/timer 101, and counter/divider 100 by diode 197. Thus, at power turn-on, flip-flops 104-107, oscillator/timer 101 and counter/divider 100 are initially reset. The OR gate, the flip-flops, and the AND gates may be implemented with CD4071, CD4013, and CD4081 integrated circuits, respectively.

When switch 185 is set to the manual mode position the timing circuit provides just one sequential group of storage unit discharge pulses. Depressing "manual" switch 186 permits the generation of one more sequential group of storage unit discharge pulses. When momentary switch 186 is closed, a one pulse is coupled through capacitor 187 to gate 103 and flip-flop 104, oscillator/timer 101 and counter/divider 100 are reset in the manner described above. The manual mode is provided for system test functions.

Figure 13:
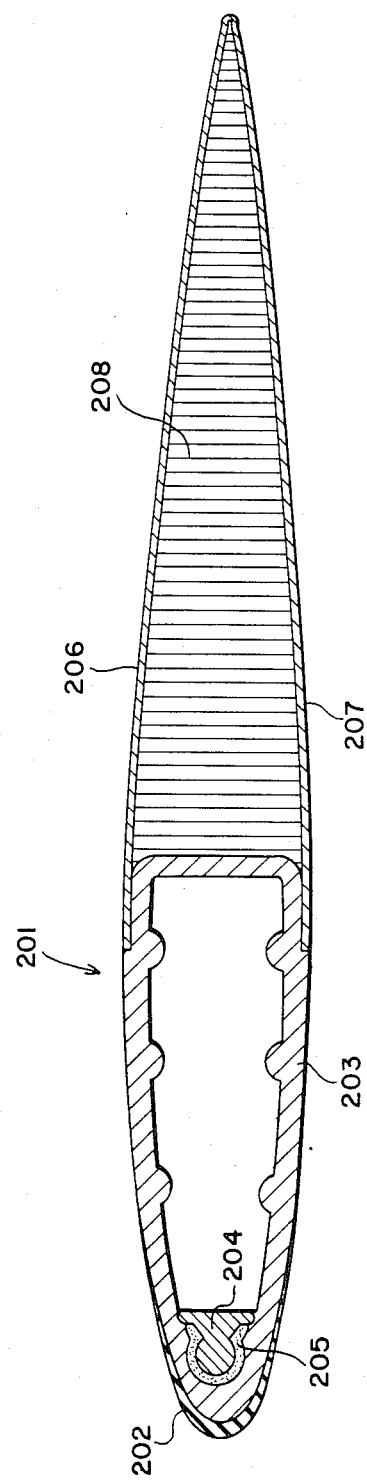
FIG. 13 is a cross-sectional view of a typical helicopter rotor blade with an electro-expulsive deicing boot secured to the leading edge.

FIG. 13 shows a cross-sectional view of a typical helicopter main rotor blade 201 with an electro-expulsive deicing boot, in its retracted state, bonded onto the rigid leading edge. The blade includes a very rigid, thick-walled, D-shaped, extruded metal spar 203 with thin, light weight metal skins 206-207 attached thereto. The chamber formed by the spar and skins is filled with a light weight honeycomb material 208. Nose bar 204 is rigidly held in place by a cement 205 and has a density and volume suitable for balancing the blade. The dimension 209 is typically 1-5/16 inches and one can see that it would be a difficult feat for a prior art solenoid-type deicer to deform the leading edge sufficiently to dislodge ice therefrom.

Figure 14:
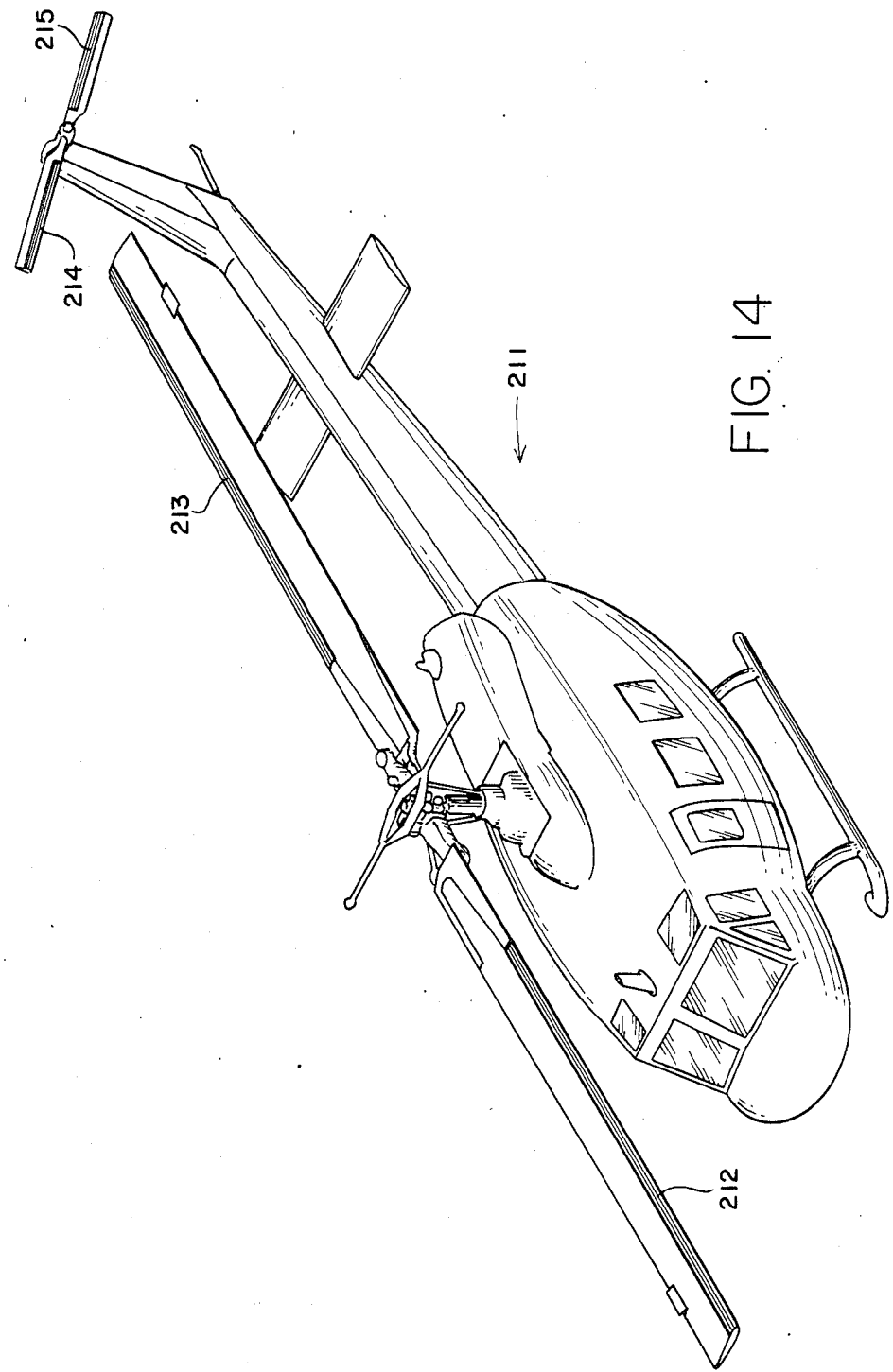
FIG. 14 is a perspective view of a helicopter with electro-expulsive deicing boots installed on the main rotor as well as the tail rotor.

FIG. 14 shows a perspective view of a helicopter 211 with deicer boots of the type described herein bonded to the main rotor as well as the tail rotor. Boots 212 and 213 are secured to the leading edges of the main rotor blades and boots 214 and 215 are attached to the leading edges of the tail rotor blades. Container 216 houses the electronic circuitry for boots 213 and 213 with the exception of a low voltage power supply. Low voltage is fed to the circuitry via electrical slip rings mounted on the rotor hub.

It is not essential that a deicing boot in accordance with the subject invention be installed along the entire leading edge of a helicopter rotor blade from root to tip. If the tip portion (approximately from the 70% station to the 98-100% station) is coated with an appropriate material such as a polyurethane, ice will be shed therefrom as a result of centrifugal force. The root portion of the blade produces a very minor lift during rotation. Icing in that portion can therefore be ignored unless operation of the helicopter is being contemplated in very severe icing conditions.

Figure 15:
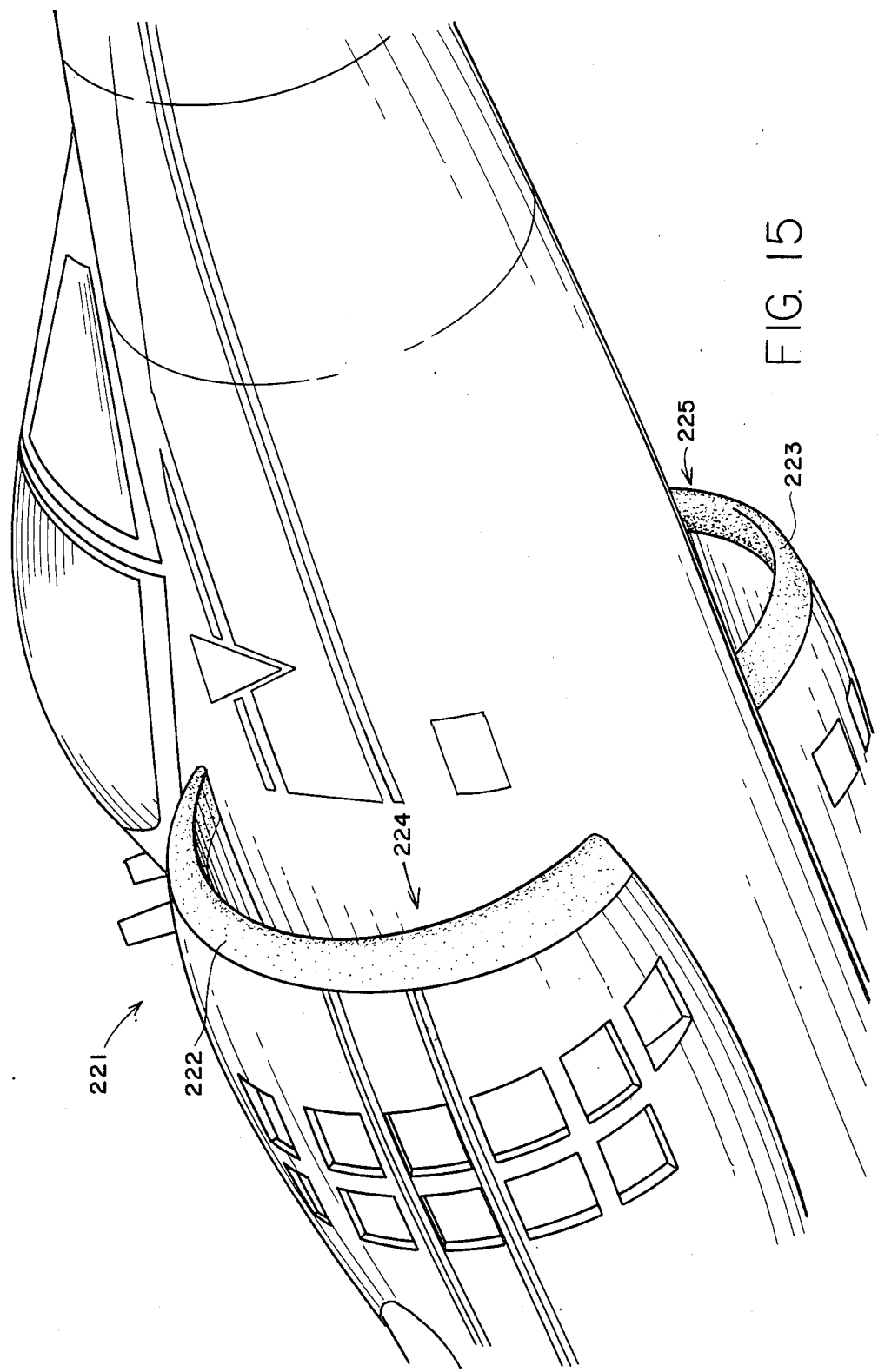
FIG. 15 is a perspective drawing of a jet aircraft with electro-expulsive deicing boots installed on the engine intakes.

FIG. 15 is a perspective view of a jet aircraft 221 with deicing boots 222 and 223 made in accordance with this invention installed on the leading edges of engine intake ducts 224 and 225, respectively.

In practice, the separation system of this invention can either be installed on aircraft structural members at the time of initial aircraft fabrication, or added on to existing aircraft in the field. In aircraft designs where provisions for the subject deicing boot is intended to be an integral part of the airfoil, the designer may specify that the airfoil's leading edge surface be recessed by an amount comparable to the thickness of the relaxed boot so as to preserve the desired original airfoil configuration. Because the flexible layers may be adhesively mounted to structural member surfaces, such field installation is readily carried out. For a typical installation, the power supplies and other circuit elements for the system weigh 50 pounds or less.

In situations where r-f energy is found to radiate from the embedded conductive members, and that radiation is objectionable, the conductive members may be surrounded or partially surrounded with flexible electromagnetic shields 70 (FIGS. 5 and 6) which are electrically connected to a suitable reference potential (for example, electrical ground). The electromagnetic shield may be, for example, a foil or a flexible metal screen.

It should be readily apparent to those skilled in the art that a novel separation system capable of achieving the stated objects has been provided. The system provides sufficient expulsive force for ice removal with a smaller power requirement than prior art electrical deicers. The system does not significantly impair aerodynamic performance of the aircraft and it removes the ice without fatiguing the structural members of the aircraft. The system of this invention may either be installed on new aircraft or readily added to existing aircraft in the field. The invention provides the first practical deicer for a helicopter rotor.

While the electro-expulsive separation system has been described with reference to particular embodiments, it should be understood that such embodiments are merely illustrative as there are many variations and modifications which may be made by those skilled in the art. Thus, the invention is to be construed as being limited only by the spirit and scope of the claims.

We claim:

1. Apparatus comprising first and second opposed, flexible, ribbon-shaped, electrically conductive members, a resilient insulating member being of generally sheet-like configuration having first and second opposed surfaces, said first and second conductive members being embedded in spaced apart relationship and electrically isolated from each other in said resilient insulating member with said first and second conductive members being adjacent said first and second surfaces of said insulating member, respectively, said electrically conductive members being electrically interconnected so that any electrical current flowing in said first conductive member also flows in said second conductive member in a direction opposite to the flow in said first conductive member, said resilient insulating member having at least one void positioned between said first and second conductive members so as to facilitate separation between said first and second conductive members when electric current is routed through said conductive members and said conductive members repel each other, said void having a height less than the distance between said conductive members so that a portion of said insulating member is between said opposed conductive members.

2. Apparatus as in claim 1 wherein said void is generally of a slot-like configuration and is at least coextensive with said opposed surfaces.

3. Apparatus as in claim 1 wherein said void is entirely surrounded by said resilient insulating material and a vacuum is created in said void when the void is distended by the repelled conductive members.

4. The apparatus of claim 1 wherein at least one wall of said void is lined with a release film.

5. Apparatus as set forth in claim 1 wherein said conductive members have a serpentine configuration.

6. The apparatus of claim 1 in which there are a plurality of pairs of opposed electrically conductive members and a plurality of voids.

7. The apparatus of claim 5 wherein the electrically conductive members of one pair have a linear configuration and the electrically conductive members of another pair have a serpentine configuration.

8. The apparatus of claim 1 wherein the resilient insulating member comprises an erosion resistant elastomer.

9. The apparatus of claim 1 wherein the resilient insulating member has an outer layer of erosion resistant elastomer.

10. The apparatus of claim 1 in which there are a plurality of pairs of opposed electrically conductive members and the members sandwich said void.

11. The apparatus of claim 1 wherein said electrically conductive members are formed from tantalum.

12. The apparatus of claim 1 wherein an electromagnetic shield is embedded in said resilient insulating member in proximity to at least one conductive member.

13. In combination, the apparatus of claim 1 and an airfoil, said first surface of said resilient insulating member being attached to the outer surface of said airfoil.

14. The combination of claim 13 wherein said airfoil is a wing leading edge and said resilient insulating member is flexed to conform to said outer surface of said airfoil.

15. The combination of claim 13 in which said airfoil is a helicopter rotor blade.

16. The combination of claim 13 in which said airfoil is an engine intake duct.

17. Apparatus as set forth in claim 1 further comprising circuit means coupled to said conductive members for generating large current pulses, the current flow direction in said first conductive member being opposite to the current flow direction in said second conductive member, the opposing currents and the resulting interacting magnetic fields producing an electrorepulsive force between said first and second conductive members to move said conductive members apart and to distend said resilient insulating member.

18. The apparatus of claim 17 including a plurality of pairs of opposed conductive members and wherein said circuit means successively generates a large current pulse to each pair of conductive members.

19. The apparatus of claim 17 wherein said circuit means includes at least one electrical energy storage capacitor and means for alternately charging and discharging said capacitor.

20. The apparatus of claim 19 in which said charging and discharging means comprises a power source, a first switch for connecting said capacitor to said power source, a second switch for connecting said capacitor to said conductive members, and a timing circuit for opening said second switch when said first switch is closed, and opening said first switch when said second switch is closed.

21. A circuit for a system for separating a solid body from a surface, which comprises first and second ribbon-shaped, flexible conductive members in overlying, closely spaced relationship, a sheet-like resilient member adapted to be interposed between said surface and said solid body, said conductive members being imbedded in said resilient member and said resilient member having a void positioned between said conductive members to facilitate separation of said conductive members, said conductive members being electrically insulated from each other along their length and connected so that a current flowing in a given direction in said first conductive member flows in an opposite direction in said second conductive member and causes said conductive members to separate, at least one storage capacitor connected to a power source through a first switch, said storage capacitor being connected in a low resistance path to said first and second conductive members through a second switch, and a timing circuit connected to open said second switch when said first switch is closed to charge said storage capacitor, and to open said first switch when said second switch is closed to discharge said storage capacitor into said first and second conductive members.

22. The circuit of claim 21 in which said at least one storage capacitor comprises a plurality of parallel connected capacitors.

23. The circuit of claim 21 comprising a plurality of pairs of said first and second ribbon-shaped, flexible conductive members, at least one storage capacitor and first and second switches being provided for each conductive member pair, and said timing circuit being configured to close said second switches to discharge said storage capacitors into said conductive member pairs successively.

24. The circuit of claim 21 additionally comprising means for discharging said at least one storage capacitor in absence of power to said circuit.

25. The circuit of claim 21 in which said first and second conductive members are formed from a conductor which is folded back on itself so as to have two closely-spaced substantially overlapped segments or legs comprising said first and second conductive members.

26. The solid body separating system of claim 25 in which said first and second conductive members are serpentine in configuration.

27. The solid body separating system of claim 26 in which said first and second conductive members are formed from tantalum.

* * * * *